Feb. 15, 1927.
H. KNOTHE
1,617,814
PIPE CUTTING MACHINE
Filed Jan. 18, 1926
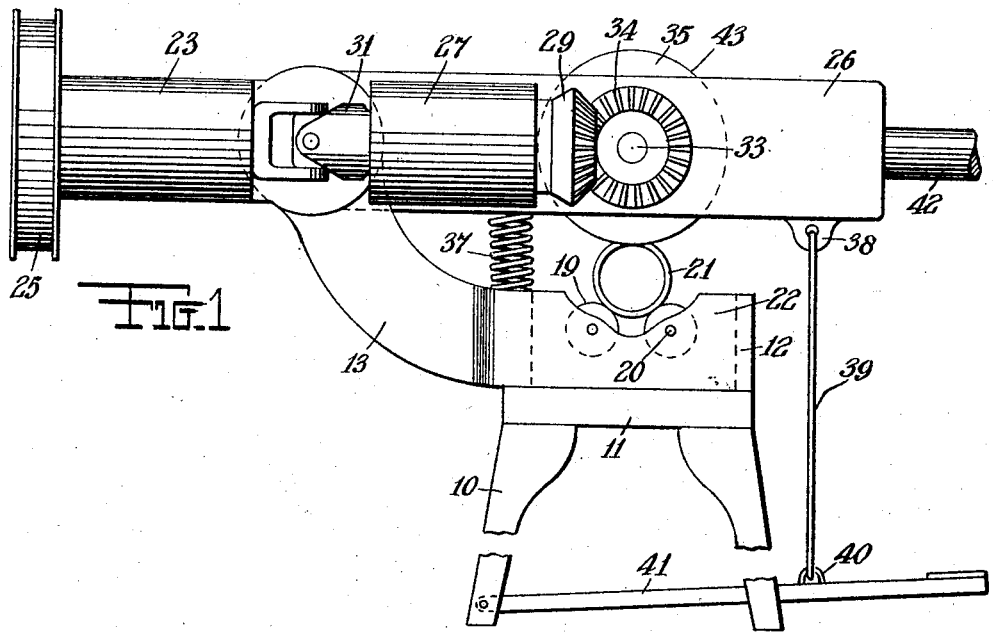
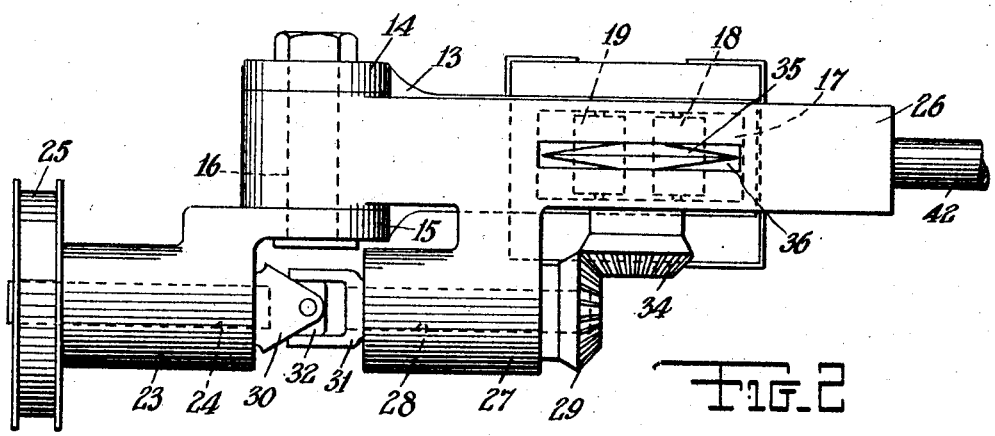
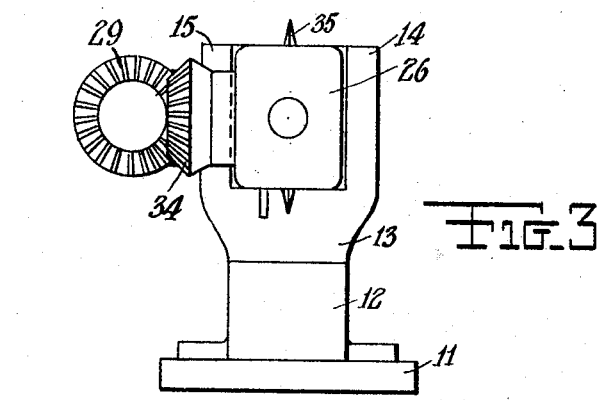
INVENTOR
*H. Knothe*
BY *F. Ledermann*
ATTORNEY Patented Feb. 15, 1927.

1,617,814

UNITED STATES PATENT OFFICE.

HERMAN KNOTHE, OF RICHMOND HILL, NEW YORK.

PIPE-CUTTING MACHINE.

Application filed January 18, 1926. Serial No. 81,929.

The main object of this invention is to provide an improved type of mechanical pipe cutting machine. One of the characteristics is that any size of pipe may be cut within a reasonable range by the application of either a foot or hand lever. The machine consists of a drive shaft rotatable in a fixed bearing and an aligned driven shaft which is connected to the drive shaft by a universal joint and may be tilted to an appreciable angle so that a cutting wheel may be lifted a sufficient distance to permit the insertion of various sizes of pipes under it. The novelty of the invention lies in the combination of a fixedly placed rotatable shaft and an additional tiltable shaft, both being mutually connected so that the driving shaft is not displaced angularly when the tiltable shaft is lifted or lowered.

The above and other objects will become apparent in the description below in which characters of reference refer to like-named parts in the drawing.

Referring briefly to the drawing, Figure 1 is a side elevational view of the machine showing the method of cutting a pipe.

Figure 2 is a top plan view of the same.

Figure 3 is an end elevational view of Figure 2.

Referring in detail to the drawing, the numeral 10 indicates the legs of a table 11. On the latter, the entire pipe cutting machine is mounted at a level suitable for its convenient use. A box 12 is mounted on the table in a rigid manner and from one end thereof an arm 13 extends curvedly upward and supports the pipe cutting mechanism. At the upper extremity of the arm 13, a pair of upstanding ears 14 and 15 are located. Said ears are separated by a space and have aligned openings which receive a king bolt 16.

The box-like structure 12 heretofore mentioned forms an enclosure 17 in which a pair of rollers 18 and 19 are adapted to rotate on spindles 20. These rollers are of the idler type, being freely turnable and are adapted to support between them the pipe, such as indicated by the numeral 21, which is to be cut. The side walls 22 of the box have portions removed therefrom so that the peripheries of the upper parts of said rollers are clearly visible and permit sufficient clearance for the pipe being cut to extend clear across the box totally supported on the rollers 18 and 19.

The ear 15 has a sleeve 23 integral therewith which extends in a horizontal direction. Said sleeve is bored thruout its entire length, the bore being suited to receive a drive shaft 24. One end of the drive shaft projects from the outer end of the sleeve 23 and has a pulley wheel 25 fixed thereto, which may be connected by a belt or other means to a source of power. A relatively heavy lever 26 has one end pivoted on the king bolt 16 and fills the space created between the ears 14 and 15. This lever 26 has a sleeve 27 integral therewith. Said sleeve has a bore extending thruout its entire length whose axis is aligned with the bore of the sleeve 23 when the lever 26 is in horizontal position. In the bore of the sleeve 27, a spindle 28 is rotatably mounted. One end of said spindle projects from the front of the sleeve 27 and has a bevelled gear 29 rigidly secured thereto. The adjacent ends of the shaft 24 and the spindle 28 project somewhat from their respective sleeves toward each other, said shaft and spindle being mutually connected by a universal joint consisting of parts 30 fixed to the shaft 24, element 31 fixed to the spindle 28, and an intermediate pivot element 32, the parts 30 and 31 being interconnected by suitable pivot pins, as shown. A stud 33 is rotatably mounted in the lever 26 and extends across the lever in a plane at right angles to the axis of the shaft 24 and aligned spindle 28. One end of the stud projects from one side of the lever 26 and has a bevelled gear 34 fixed thereto. The latter is retained in continual mesh with the bevelled gear 29 and transmits rotation of the stud 33 on which a knife disk 35 is fixed. This knife disk rotates in a rectangular chamber 36 formed in the arm 26, it being noted that the periphery of the knife disk at the top and bottom projects from both sides of the arm so that it may come in contact with the work it is desired to cut. To retain the lever 26 in lifted position, a spring 37 is provided. This spring seats upon the curved arm 13 between the arm and the lever 26 and yieldably lifts said lever upwardly so that it normally rests in lifted position. Near the outer free end of the lever 26, an ear 38 is formed in which an opening is provided. Into this opening, the looped end of a connecting rod 39 is inserted. The connecting rod hangs downwardly and is connected to an eyelet 40 at its lower end, the eyelet being fixed upon the foot bar 41 which is pivoted between two of the legs 10 and extends outwardly from the table beneath member 11 at a convenient position where the foot may be readily placed upon it. A handle bar 42 projects from the free end of the lever 26 and is adapted to be manipulated by the hand when cutting pipes.

In using the pipe cutting machine illustrated, a belt connects the pulley 25 to some rotative source of power. The handle bar 42 is lifted and a pipe such as 21 is inserted beneath the cutting disk 35 and the arm 26 in such position so that it will be supported upon the rollers 18 and 19 in the position shown in Figure 1. When the pulley 25 is rotated, rotation is transmitted to the driven shaft 28 thru the universal joint consisting of parts 30, 31, and 32, and the driven shaft 24. The driven shaft 28, having a bevelled gear 29 secured thereto, rotates the bevelled gear 34, as both gears are intermeshed. The gear 34, being fixed on the end of the stud 33, rotates the latter and this in turn rotates the cutting disk 35 which is fixed on the stud 33. By either applying pressure to the foot bar 41 or the handle bar 42, the cutting edge 43 of the disk 35 is pressed into the wall of the pipe and thru rotation frictionally, rotates this pipe on the rollers 18 and 19 and simultaneously shears said pipe into two parts.

I claim:—

1. In a pipe cutting machine, an upwardly curved arm having a horizontal sleeve extending therefrom, a drive shaft rotatable in said sleeve, a lever pivoted on said curved arm and having a recess therein, an additional sleeve on said lever adapted to be aligned with the first-named sleeve in a horizontal plane, a driven shaft in said sleeve, a universal joint connecting the drive and driven shafts permitting tilting of the latter and said lever, a cutting disk mounted in the recess of said lever, and means for rotating said cutting disk.

2. In a pipe cutting machine an upwardly curved arm having a horizontal sleeve extending therefrom, a drive shaft rotatable in said sleeve, a lever pivoted on said curved arm, an additional sleeve on said lever adapted to be aligned with the first-named sleeve in a horizontal plane, the longitudinal axis of said additional sleeve intersecting the axis of the pivoted lever, a driven shaft in said sleeve, a universal joint connecting the drive and driven shafts permitting tilting of the latter, a cutting disk mounted in said lever, a stud having said cutting disk mounted rigidly thereon, bevelled gears on said stud and driven shaft, said gears being intermeshed, and revoluble rollers beneath said lever adapted to rollably support the work to be cut by said cutting disk.

In testimony whereof I affix my signature.

HERMAN KNOTHE.